(12) United States Patent
Mann

(10) Patent No.: US 6,898,101 B1
(45) Date of Patent: *May 24, 2005

(54) MICROCONTROLLER WITH PROGRAMMABLE LOGIC ON A SINGLE CHIP

(75) Inventor: Eric N. Mann, Issaquah, WA (US)

(73) Assignee: Cypress Semiconductor Corp., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 991 days.

(21) Appl. No.: 08/991,232

(22) Filed: Dec. 16, 1997

(51) Int. Cl.[7] ............................................. G06F 9/26
(52) U.S. Cl. ..................................... 365/51; 365/52
(58) Field of Search ........................ 365/52, 63, 189.01, 365/189.05, 154, 230.02; 326/37, 41, 38, 39

(56) References Cited

U.S. PATENT DOCUMENTS

| | | | |
|---|---|---|---|
| 4,051,352 A | | 9/1977 | Eichelberger et al. ...... 364/716 |
| 4,940,909 A | | 7/1990 | Mulder et al. .............. 307/465 |
| 5,204,663 A | * | 4/1993 | Lee ........................ 340/825.34 |
| 5,237,699 A | | 8/1993 | Little et al. ................. 395/750 |
| 5,241,224 A | | 8/1993 | Pedersen et al. ............ 307/465 |
| 5,268,598 A | | 12/1993 | Pedersen et al. ............ 307/465 |
| 5,287,017 A | * | 2/1994 | Narasimhan et al. ......... 326/37 |
| 5,373,189 A | * | 12/1994 | Massit et al. ............... 257/686 |
| 5,384,499 A | | 1/1995 | Pedersen et al. ............. 326/39 |
| 5,386,155 A | * | 1/1995 | Steele et al. .................. 326/37 |
| 5,426,744 A | * | 6/1995 | Sawase et al. .............. 395/375 |
| 5,511,211 A | * | 4/1996 | Akao et al. ................. 395/800 |
| 5,548,228 A | | 8/1996 | Madurawe ................... 326/41 |
| 5,548,552 A | | 8/1996 | Madurawe ............. 365/185.33 |
| 5,550,842 A | | 8/1996 | Tran ........................... 371/21.4 |
| 5,557,217 A | | 9/1996 | Pedersen ...................... 326/39 |
| 5,572,148 A | * | 11/1996 | Lytle et al. .................... 326/41 |
| 5,594,367 A | * | 1/1997 | Trimberger et al. .......... 326/41 |
| 5,598,108 A | * | 1/1997 | Pedersen ...................... 326/41 |
| 5,608,337 A | | 3/1997 | Hendricks et al. .......... 324/765 |
| 5,656,548 A | * | 8/1997 | Zavracky et al. ............. 438/23 |
| 5,752,063 A | | 5/1998 | DeRoo et al. ............... 395/800 |
| 5,757,207 A | * | 5/1998 | Lytle et al. .................... 326/39 |
| 5,760,607 A | * | 6/1998 | Leeds et al. .................. 326/38 |
| 5,793,115 A | * | 8/1998 | Zavracky et al. ............ 257/777 |
| 5,798,656 A | | 8/1998 | Kean ............................ 326/39 |
| 5,990,717 A | | 11/1999 | Partovi et al. ............... 327/210 |
| 6,005,806 A | | 12/1999 | Madurawe et al. .... 365/185.23 |
| 6,025,737 A | | 2/2000 | Patel et al. .................... 326/80 |

FOREIGN PATENT DOCUMENTS

| | | | |
|---|---|---|---|
| EP | 0420388 | 4/1991 | .................. 31/318 |
| EP | 0455414 | 11/1991 | .................. 23/525 |
| EP | 0510815 | 10/1992 | .................. 19/177 |

OTHER PUBLICATIONS

Osamu Matsumoto et al., 1.5V High Speed Read Operation and Low Power Consumption Circuit Technology For EPROM and Flash–EERPOM, 1993, pp. 25.4.1.–25.4.4.

Charles Melear, Integrated Memory Elements On Micocontroller Devices, pp. 507–514.

(Continued)

Tetsuyuki Fukushima et al., A Microcontroller Embedded with 4Kbit Ferroelectric Non–Volatile Memory, 1996, pp. 46–47.

*Primary Examiner*—Gene N. Auduong
(74) *Attorney, Agent, or Firm*—Christopher P. Maiorana, PC

(57) ABSTRACT

A programmable logic device, a memory device and a microcontroller manufactured on a single integrated circuit chip. In one example, the programmable logic device may comprise one or more macrocells each comprising an input/output macrocell or a buried macrocell. In another example, the programmable logic device may be a complex programmable logic device (CPLD) or a programmable logic array (PLA).

21 Claims, 3 Drawing Sheets

OTHER PUBLICATIONS

Julie Krueger, Integrated Circuits For Smart Cards, Oct. 9, 1995, pp. 1168–1170.

Stan Kopec et al., Obtaining 70MHz Performance In The Max Architecture, May 1991, pp. 69–74.

Scott Frake et al., A 9ns, Low Standby Power CMOS PLD With a Single–Poly EPROM Cell, Feb. 17, 1989, pp. 344–346.

A. Shubat et al., A User–Programmable Peripheral With Functional Unit Architecture, pp. 23–24.

Rakesh Patel et al., A 10ns, 4000 Gate, 160 Pin CMOS EPLD Developed on A 0.8um Process, 1993, pp. 7.6.1–7.6.5.

Katsuhiko Ohaski et al., Sippos (Single Poly Pure CMOS) EEPROM Embedded FPGA By News Ring Interconnection and Highway Path, 1994, pp. 9.4.1.–9.4.4.

Daniel E. Smith, Intel's FLEXlogic FPGA Architecture, 1993, pp. 378–384.

Frank Goodenough, Analog Counterparts Of FPGAs Ease System Design, Oct. 14, 1994, pp. 63–73.

Umesh Shama et al., A 0.5 um Technology For Advanced Microcontroller Applications, 1994, pp. 67–68.

Chris Jay, PSD301 Programmable Peripheral With Memory For Microcontroller and Embedded Microprocessor Applications, Jul. 1991, pp. 333–341.

Nobuyuki Ikeda et al., Single Chip Microcontroller With Internal EPROMs, Jun. 1990, pp. 295–302.

Nobuo Tsuda, Dual and Fail–Safe Redundancy for Static Mask–ROMs and PLAs, 1993, pp. 57–66.

H. Muroga, A large Scale FPGA with 10K Core Cells with CMOS 0.8um 3–Layered Metal Process, 1991, pp. 6.4.1.–6.4.4.

Jesse Jenkins, Microcontroller Acceleration, 1993, pp. 416–424.

Alexander S. Shubat et al., A Family of User–Programmable Peripherals with a Functional Unit Architecture, Apr. 1992, pp. 515–529.

* cited by examiner

US 6,898,101 B1

MICROCONTROLLER WITH PROGRAMMABLE LOGIC ON A SINGLE CHIP

FIELD OF THE INVENTION

The present invention relates to microcontrollers generally and, more particularly, to a microcontroller incorporating a programmable logic device.

BACKGROUND OF THE INVENTION

Conventional approaches to the fabrication of microcontrollers and programmable devices generally require the fabrication of a microcontroller and a programmable device as discrete independent packages or components. In applications where a limited number of gates are required, the overhead (e.g., the additional processing steps) associated with fabricating a programmable device such as a complex programmable logic device (CPLD), a programmable logic device (PLD) or a programmable logic array (PLA), in addition the overhead associated with fabricating a discrete microcontroller, makes the overall design impractical. While previous approaches may implement a microcontroller interface external to the programmable device, conventional approaches have not implemented a programmable device on the same chip as the a microcontroller.

SUMMARY OF THE INVENTION

The present invention concerns a programmable logic device, a memory device and a microcontroller manufactured on a single integrated circuit chip. In one example, the programmable logic device may comprise one or more macrocells each comprising an input/output macrocell or a buried macrocell. In another example, the programmable logic device may be a complex programmable logic device (CPLD) or a programmable logic array (PLA).

The objects, features and advantages of the present invention include fabricating a programmable logic device, a memory device and a microcontroller on a single integrated circuit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
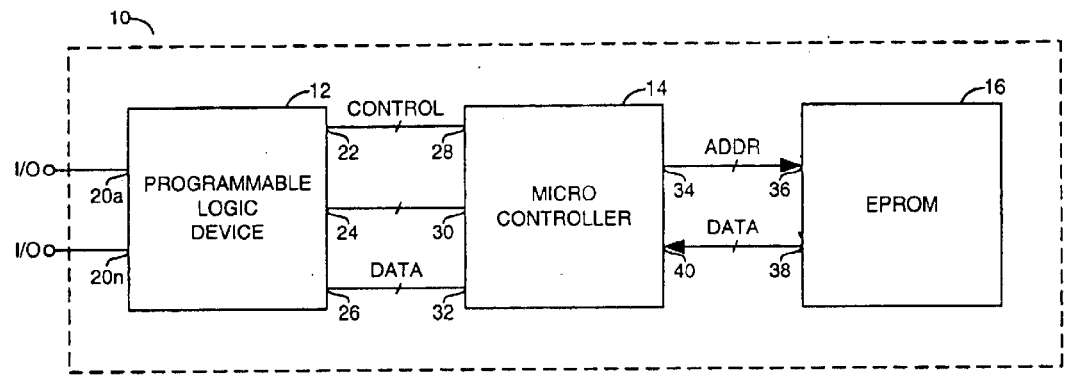
FIG. 1 is a block diagram of a preferred embodiment of the present invention.

Referring to FIG. 1, a block diagram of a circuit 10 is shown in accordance with a preferred embodiment of the present invention. The circuit 10 generally comprises a programmable logic device (or circuit) 12, a microcontroller 14 and an EPROM 16. The programmable device 12 may have an input and/or output 20a and an input and/or output 20n that may each receive or send signals from external devices. The programmable device 12 may also have an input 22, an input 24 and an output 26. The input 22 may receive control information from an output bus 28 of the microcontroller 14. The input 24 may receive data information from an output bus 30 of the microcontroller 14.

The input 32 of the microcontroller 14 may be a multi-bit input that may receive data signals from the output bus 26 of the programmable device 12. The microcontroller 14 may include an output 34 that may present address information to an input 36 of the EPROM 16. An output 38 of the EPROM 16 may present data information to an input 40 of the microcontroller 14. The EPROM 16 may be implemented as a variety of non-volatile memories including an EPROM, an EEPROM, a flash memory, etc. If the programmable device 12, the microcontroller 14 and the EPROM 16 are fabricated as a single circuit 10, the overall device area needed to implement a particular application requiring the particular elements of each component may be reduced by combining one or more processing steps common to each device.

Figure 2:
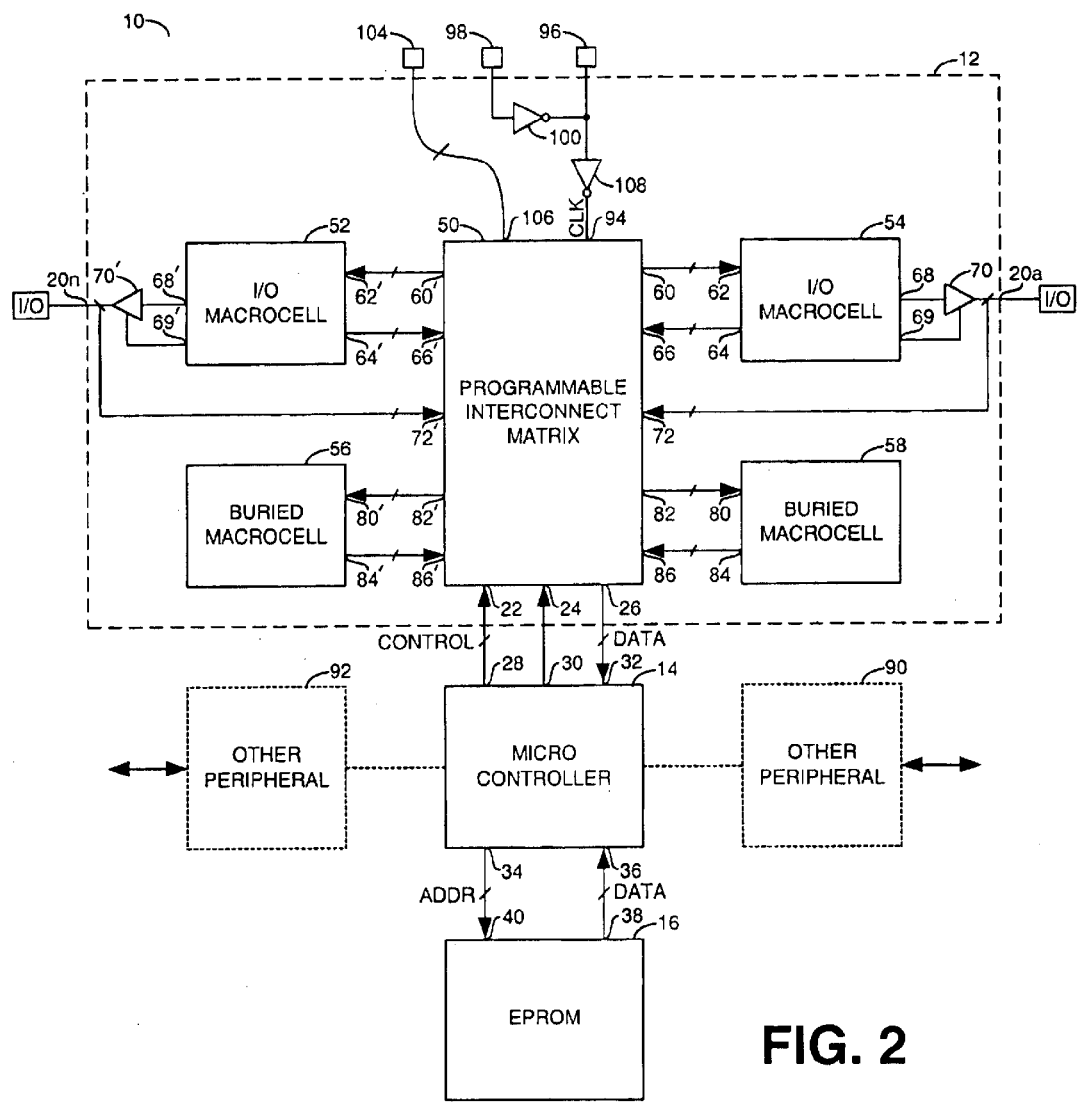
FIG. 2 is a more detailed block diagram of a preferred embodiment of the present invention.

Referring to FIG. 2, a more detailed block diagram of the circuit 10 is shown. In particular, the programmable logic device 12 is shown implemented as a programmable interconnected matrix (PIM) 50, an input/output (I/O) macrocell 52, an input/output (I/O) macrocell 54, a buried macrocell 56 and a buried macrocell 58. The PIM 50 is shown comprising an output 60 that may present a signal to an input 62 of the macrocell 54. An output 64 of the macrocell 54 may present a signal to an input 66 of the PIM 50. The macrocell 54 may also present a signal at an output 68, through a buffer 70, to the output 20a. The buffer 70 may be enabled or disabled with signal 69. The output of the buffer 70 may also be presented to an input 72 of the PIM 50.

The macrocell 54, the buffer 70 and the output 20a generally represent the devices necessary to implement an typical I/O macrocell (to be described in more detail in connection with FIG. 3). The macrocell 52 may have inputs and outputs similar to the macrocell 54 and is shown represented with the primed reference numbers 60', 62', 64', 66', 68' 69' and 70'.

The buried macrocell 58 (to be described in more detail in connection with FIG. 4) generally comprises an input 80 that may receive a signal from an output 82 of the PIM 50. An output 84 of the buried macrocell 58 may present a signal to an input 86 of the PIM 50. The buried macrocell 56 may have similar inputs and outputs as the buried macrocell 58 and is shown generally represented with the primed reference numbers 80', 82', 84' and 86'.

The microcontroller 14 is shown generally connected to additional peripherals generally labeled as other peripheral block 90 and other peripheral block 92. The other peripherals may be additional components necessary to implement the circuit 10 in a particular design application. For example, the circuit 10 may be implemented in the context of a Peripheral Component Interconnect (PCI) computer bus. In such an example, the other peripherals 90 and 92 may represent components of the PCI bus. Examples of PCI peripherals may include a PCI bridge, a PCI host adapter (e.g., ISA, EISA, MCA, SCSI, etc.), or other PCI peripherals or PCI agents. The PIM 50 additionally comprises an input 94 that may receive a signal (e.g., CLK) from an external pin 96 or an external pin 98. The pins 96 and 98 are generally connected to the input 94 through an inverter 100 and an inverter 102. As a result, the input 94 may receive the signal CLK representing an external periodic clock. The inverter 100 may be used as part of an oscillator circuit when combined with external components. The PIM 50 may also receive additional external signals 104 at the PIM input 106.

Figure 3:
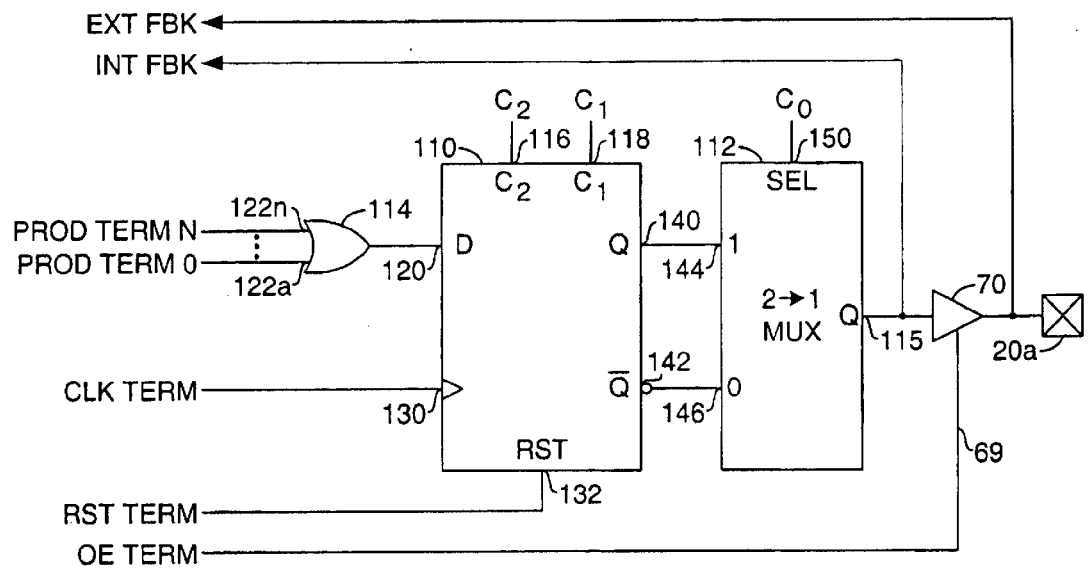
FIG. 3 is a more detailed block diagram of an I/O macrocell illustrated in FIG. 2.

Referring to FIG. 3, a more detailed block diagram of the I/O macrocell 52 or 54 is shown. In one example, the I/O macrocell 52 is shown having a memory block (or circuit) 110, a multiplexor block (or circuit) 112 and a gate 114. The multiplexor block 112 may be implemented as a 2:1 multiplexer having an output 115 that may present a signal to the buffer 70. The memory block 110 may be implemented as a flip-flop that may operate in a variety of modes determined by a first select input 116 and a second select input 118. The mode of the memory block 110 may be determined by the following TABLE 1:

TABLE 1

| C2 | C1 | Mode |
|---|---|---|
| 1 | 1 | D-FF |
| 1 | 0 | T-FF |
| 0 | 1 | Latch |
| 0 | 0 | Buffers |

The mode column in TABLE 1 generally illustrates the mode of operation of the memory block 110. The first mode generally indicates a D-flip-flop operation, the second mode generally indicates a T-flip-flop (toggle) operation, the third mode generally indicates a latch operation and the fourth mode generally indicates a buffer operation.

The memory block 110 also has an input 120 that receives a signal from the gate 114. The gate 114 comprises a number of inputs 122a-122n. Each of the inputs 122a-122n may receive a product term signal (e.g., ProdTerm0-ProdTermN). When the gate 114 is implemented as an OR gate, a signal may be presented to the input 120 when any of the product term signals ProdTerm0-ProdTermN are present at the inputs 122a-122n. The block 110 also comprises an input 130 that may receive a clock signal (e.g., CLK). The memory block 110 also has an input 132 that may receive a reset signal (e.g., RST Term). The configuration signals C1 and C2 may be presented to the inputs 116 and 118 and may be received from the EPROM 16. As a result, the functionality of the macrocell 52 may be adjusted after the fabrication of the circuit 10.

The memory block 110 also comprises an output 140 and an output 142 that generally represent an output Q and an output Q bar. The output Q bar may be a complementary signal to the output Q presented at the output 140. The multiplexor 112 has an input 144 and an input 146 that may each receive the output Q and the output Q bar, respectively. The multiplexor block 112 also has a select input 150 that may receive a select signal C0 that may be used to select between the input 144 and the input 146 to provide the signal at the output 115. The input C0 may be a configuration bit received from the EPROM 16. As a result, the macrocell 52 may invert the polarity of the signal presented at the output 20a in a post-production step after the fabrication of the circuit 10.

Figure 4:
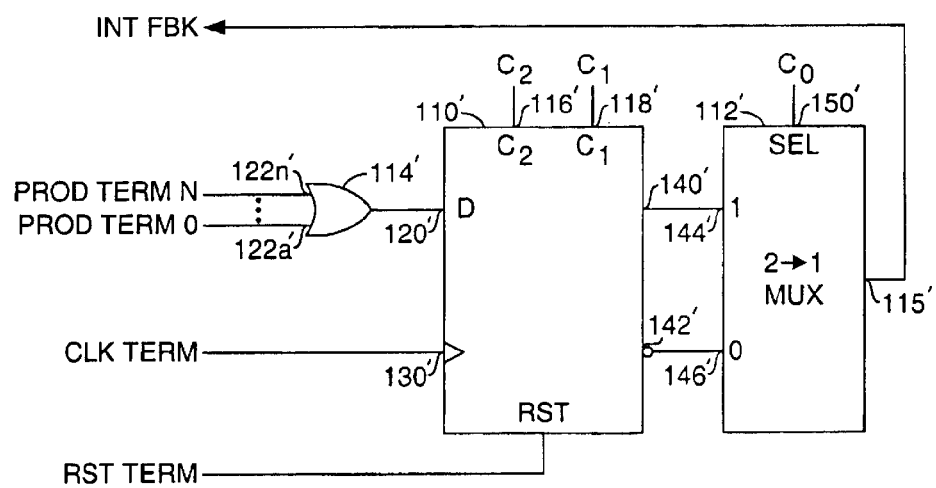
FIG. 4 is a more detailed block diagram of a buried macrocell illustrated in FIG. 2.

Referring to FIG. 4, a more detailed block diagram of the buried macrocell 58 is shown. The buried macrocell 58 comprises similar blocks and components as the macrocell 52 that are generally indicated with primed referenced numbers. For example, the block 110' may be similar to the block 110 and the block 112' may be similar to the block 112. The buried macrocell 58 generally does not implement the buffer 70 or the input/output 20a. As a result, the buried macrocell 58 may be implemented to control internal functions of the programmable logic device 12.

Figure 5:
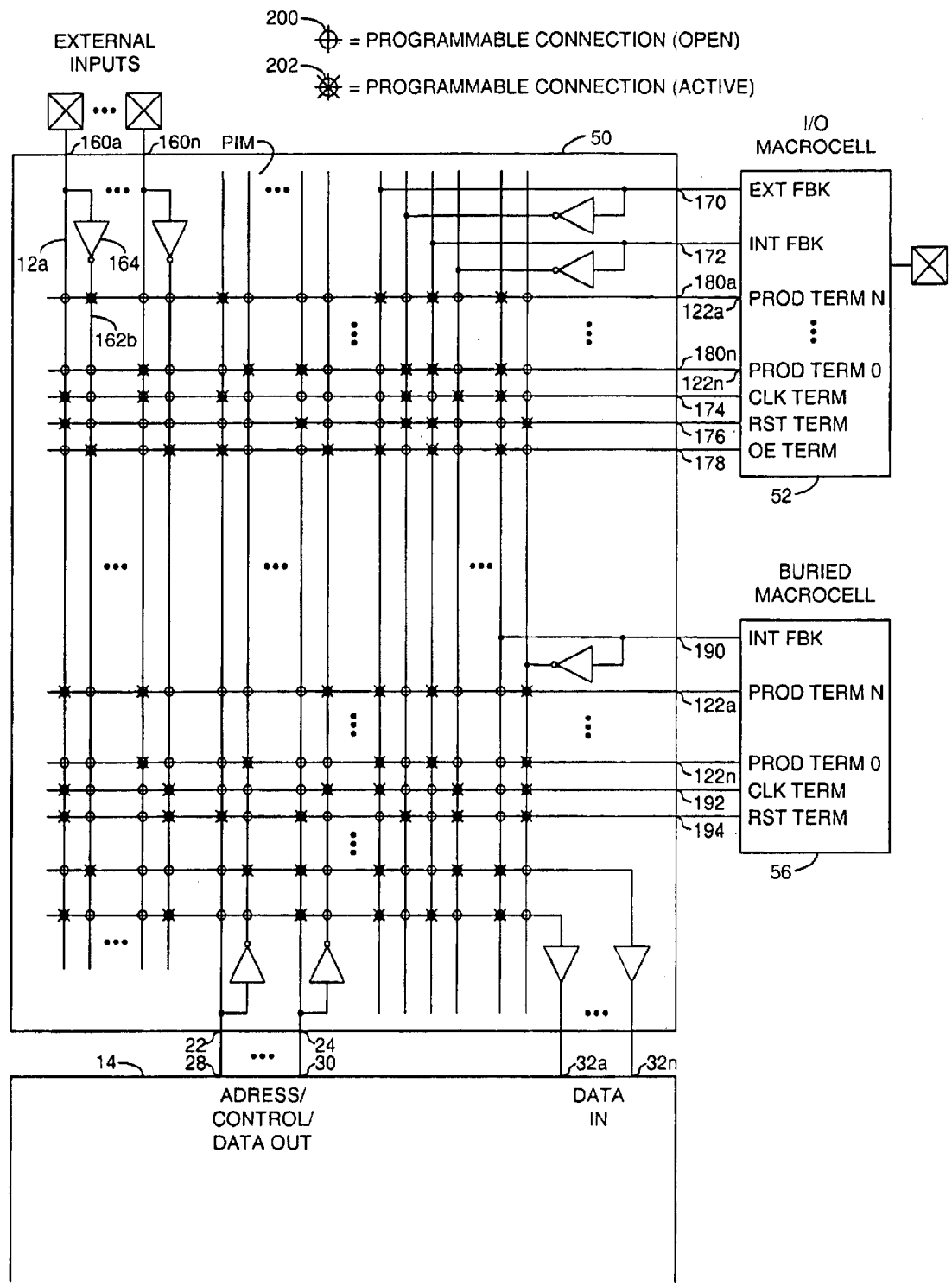
FIG. 5 is a more detailed block diagram of the programmable interconnect matrix illustrated in FIG. 2.

Referring to FIG. 5, a more detailed diagram of the programmable interconnect matrix 50 is shown. The programmable interconnect matrix 50 is shown generally connected to an I/O macrocell 52 and a buried macrocell 56. The PIM 50 has a number of inputs 160a-160n that each may receive a number of external inputs. The signals received at the inputs 160a-160n are generally presented on an internal line 162a and an internal 162b. The internal line 162b is generally inverted through an inverter 164. The signals from the I/O macrocell 52 are generally received at an input 170, an input 172, an input 174, an input 176 and an input 178. The PIM 50 may present the product term signals ProdTerm0-ProdTermN at the outputs 180a-180n that may be presented to the inputs 122a-122n. Similar outputs 190, 192 and 194 may be presented to the buried macrocell 56. Similarly, the outputs 122a-122n present the product term signals ProdTerm0-ProdTermN.

The PIM 50 may present the signals to the data inputs 32a-32n of the microcontroller 14. Address, control and data out signals may be presented at the outputs 28 and 30 to the inputs 22 and 24, respectively. The symbol 200 generally indicates a programmable connection that is in an open state. The symbol 202 generally indicates a programmable connection that is an active state. When open, a vertical signal (i.e., a signal received from the inputs 22 and 24) generally has no affect on the horizontal inputs (i.e., 170–1708). However, when a connection is active, a low condition on the vertical signal generally forms a low condition on the horizontal signal. The horizontal wires are generally arranged to form a "wired and" or "wired or" function. The active state of the vertical select wire (active high or active low) and the active state of the horizontal wire (high or low) are not generally critical and may depend on the requirements of the specific implementation.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a programmable logic circuit;
   a microcontroller connected to said programmable logic device through a first bus; and
   a memory array connected to said microcontroller through a second bus, wherein said microcontroller, said programmable device, said memory array, said first bus and said second bus are fabricated as a single integrated circuit chip.

2. The circuit according to claim 1, wherein said programmable logic circuit comprises one or more macrocells.

3. The circuit according to claim 2, wherein one or more of said macrocells comprises an input/output macrocell.

4. The circuit according to claim 3, wherein said one or more input/output macrocells comprise a memory section that may be configured as a memory element selected from the group consisting of: a D-flip-flop, a T-flip-flop, a latch and a buffer.

5. The circuit according to claim 3, wherein said one or more input/output macrocells comprises an input/output pin.

6. The circuit according to claim 4, wherein said memory section is configured in response to one or more configuration bits from said memory array.

7. The circuit according to claim 2, wherein one or more of said macrocells comprises a buried macrocell.

8. The circuit according to claim 7, wherein said one or more buried macrocell comprise a memory section that may be configured as a memory element selected from the group consisting of: a D-flip-flop, a T-flip-flop, a latch and a buffer.

9. The circuit according to claim 2, wherein one or more of said macrocells comprises a multiplexor.

10. The circuit according to claim 9, wherein said multiplexor comprises one or more product term inputs and one or more control signals.

11. The circuit according to claim 1, wherein said memory array comprises a read only memory.

12. The circuit according to claim 1, wherein said memory array comprises an erasable read only memory.

13. The circuit according to claim 1, wherein said memory array comprises an erasable and programmable memory.

14. The circuit according to claim 1 wherein said programmable logic circuit is selected from the group consisting of: a complex programmable logic device (CPLD) and a programmable logic array (PLA).

15. The circuit according to claim 1, wherein said memory array is connected only to said microcontroller.

16. The circuit according to claim 1, wherein said programmable logic circuit comprises a programmable interconnect matrix that connects one or more of an address, a control and a data out signal to said microcontroller.

17. The circuit according to claim 16, wherein said programmable interconnect matrix provides at least one of a wired AND or a wired OR.

18. The circuit according to claim 16, wherein said programmable interconnect matrix is configured to receive one or more external inputs.

19. A circuit comprising:
a programmable logic circuit;
means for processing information connected to said programmable logic circuit through a first bus; and
a memory array connected to said processing means through a second bus, wherein said programmable logic circuit, said memory array, said first bus, said second bus, and said processing means are fabricated on a single integrated circuit chip.

20. The circuit according to claim 19, wherein said programmable logic circuit is selected from the group consisting of: a complex programmable logic device (CPLD) and a programmable logic array (PLA).

21. A circuit comprising:
a programmable logic circuit, wherein said programmable logic circuit is configured to (i) receive one or more external inputs, (ii) receive signals from an I/O macrocell and a buried macrocell, and (iii) present signals to said I/O macrocell and buried macrocell;
a microcontroller connected to said programmable logic circuit through a first bus, wherein said programmable logic circuit comprises a programmable interconnect matrix that connects one or more of an address, a control and a data out signal to said microcontroller; and
a memory array connected to said microcontroller through a second bus, wherein said microcontroller, said programmable circuit, said first bus, said second bus and said memory array are fabricated as a single integrated circuit chip.

* * * * *